Patented Sept. 20, 1932

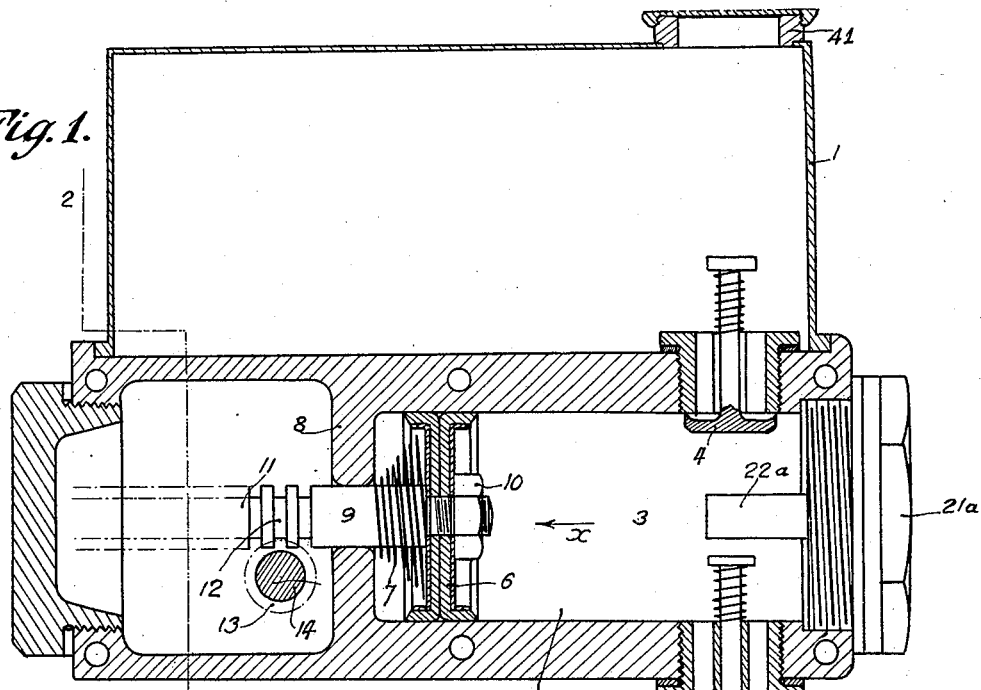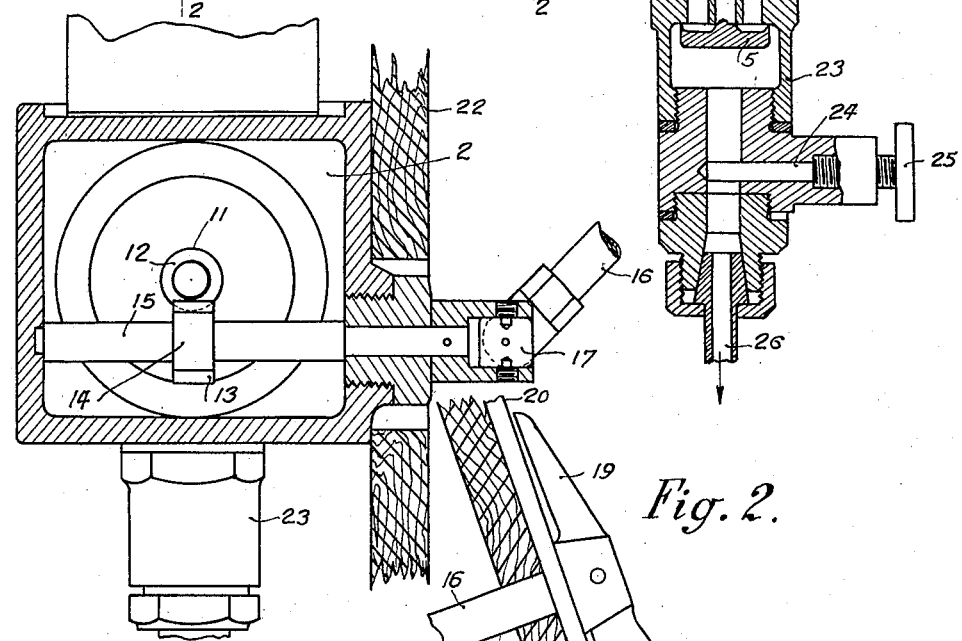

1,878,167

UNITED STATES PATENT OFFICE

JACQUES MULLER, OF LA GARENNE COLOMBES, FRANCE

LUBRICATING PUMP

Application filed October 11, 1927, Serial No. 225,525, and in France October 12, 1926.

The present invention consists essentially in withdrawing from a common lubricant reservoir, a determined quantity of lubricant and to conduct it automatically by means of a compression spring and piston, into a general pipe-system.

An apparatus for carrying out the above process is constituted by a reservoir preferably for oil being attached to a pump with which it communicates by means of a suction valve. A feed-pipe system connected to the cylinder is provided with a regulating cock controlled by a rotatable knob, rod, or even by the contact switch-lever of the vehicle.

The reservoirs could be replenished by containers containing the lubricant necessary for functioning.

The oil is supplied to a feeding device which delivers it to the general piping of the lubricating apparatus for furnishing oil to the joints to be lubricated.

The feeding device such as a piston may be of the single-acting type. It is filled from the reservoir and the oil is delivered therefrom by means of an elastic device which is compressed during the filling operation.

In order to render the invention and the method of carrying it into effect more clearly understood the accompanying drawing shows examples of the principles set forth:

Fig. 1 is a longitudinal section of a lubricating apparatus for oil.

Fig. 2 is a cross section on the line 2—2 of Fig. 1.

The apparatus, intended to function preferably with oil, is constructed with a reservoir 1 attached to a pump 2 having a cylinder 3 provided with a suction valve 4 leading into the reservoir 1, and with a compression valve 5 communicating with the general passage.

In the cylinder 3 is disposed a piston 6 constantly under the influence of a spring 7 resting against a partition 8 through which passes a rod 9, secured to the piston by a nut 10.

The rod 9 is provided at the end with a rack 11 having circular teeth 12 which engage the teeth 13 of a small pinion 14 mounted on a shaft 15 which can be given rotational movement by means of a rod 16 provided with a universal joint 17 and actuated by a handle 18 furnished with an index-pointer 19 movable in front of the graduations on a dial plate 20, which is fixed by any suitable means onto the instrument board 21 of the vehicle, whilst the pump 2 and the reservoir 1 are fixed to the dash-board 22, for example.

The cylinder 3 is closed by means of an end-member 21a furnished with a stop 22a which can be adjusted to regulate the stroke of the piston 6.

The casing member 23 containing the compression valve 5 is equipped with a needle valve 24 which can be manually actuated for example by a rotatable knob 25, or by any device connected to and actuated by the contact switch-lever of the motor.

The member 23 is connected by a tube 26 connected to feed members.

The reservoir 1 can be filled by hand by removing the closure 41 which is provided on the upper part of the reservoir. The reservoir being full, in order to assure lubrication of the friction parts the index-pointer 19 of the handle 18 is set to correspond with a specific graduation. The handle 18 being thus turned operates the rod 16 and, through the universal joint 17, rotates the shaft 15 and the pinion 14, which, by means of its teeth 13, displaces the rack 11 and the piston 10 proportionately to the angular displacement of the handle 18.

The piston 10 when moved in the direction of the arrow $x$ sucks lubricant from the reservoir 1 through the valve 4 into the cylinder 3. The handle being set free, the spring 7 pushes back the piston 10, forcing out the oil through the valve 5 and past the needle-valve 24 so that the tube 26 supplies the feed-members.

The device continues its action until the piston 10 comes up against the stop 22a.

The stroke of the piston can be adjusted in such a manner that the handle 18 is returned to its starting point every hundred kilometers, for example. In this case an electrical or mechanical contact could be provided on the speedometer of the vehicle which would take effect every hundred kilometers on the shaft 15 of the pinion 14, thus actuating the piston 10.

The above described apparatus is preferably employed with lubricating oil.

I claim:

1. A control device for lubricating systems of the type described comprising, in combination, a supply tank, a measuring chamber communicating with said tank, an outlet for said chamber, a check valve for controlling the communication between said chamber and said tank, a check valve for controlling said outlet, a piston slidably mounted in said chamber, a toothed rack carried by said piston, a pinion meshing with said rack, an operating shaft for said pinion, an operating extension rod for said pinion shaft, a universal joint interconnecting said extension rod and said pinion shaft, means for manually rotating said extension rod, spring means associated with said piston adapted to return said manually operated means to its initial position upon release thereof, a pointer on said rod rotating means, and a scale cooperating with said pointer for the purpose disclosed.

2. A control device for lubricating systems of the type described comprising, in combination, a supply tank, a measuring chamber communicating with said tank, an outlet for said chamber, a check valve for controlling the communication between said chamber and said tank, a check valve for controlling said outlet, a piston slidably mounted in said chamber, a toothed rack carried by said piston, a pinion meshing with said rack, an operating shaft for said pinion, an operating extension rod for said pinion shaft, means for manually rotating said extension rod, spring means associated with said piston adapted to return said manually operated means to its initial position upon release thereof, a stop disposed between said check valves adapted to arrest the movement of said piston under the action of said spring means, a pointer on said rod rotating means, and a scale cooperating with said pointer for the purpose disclosed.

In testimony whereof, I affix my signature.

JACQUES MULLER.